Jan. 23, 1951   U. H. LEACH   2,539,088
SHUTOFF VALVE
Filed Aug. 17, 1946
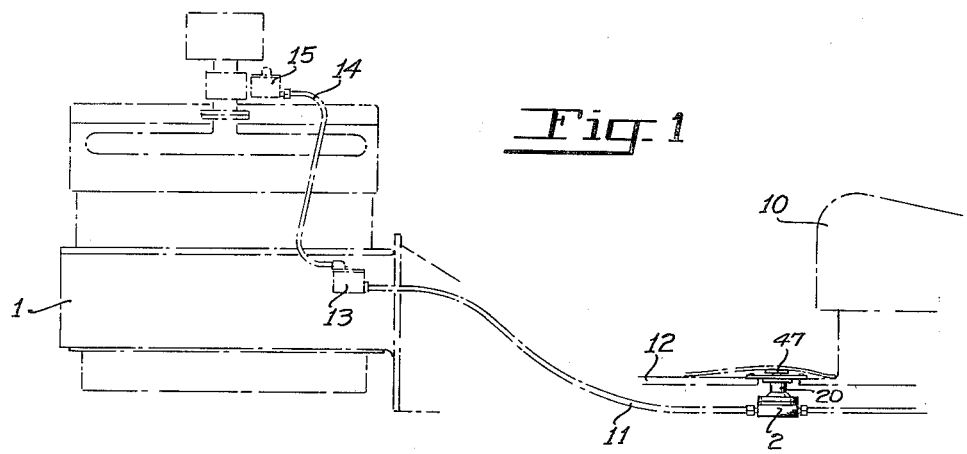
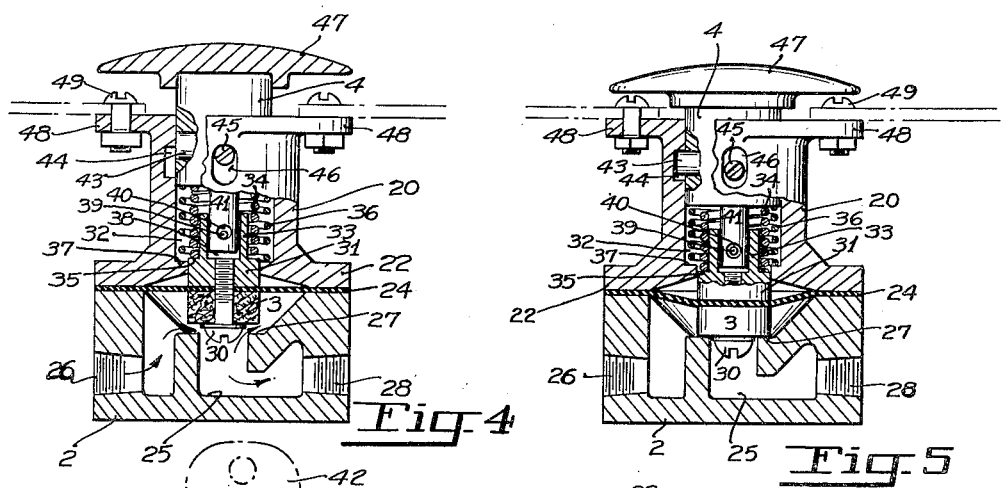
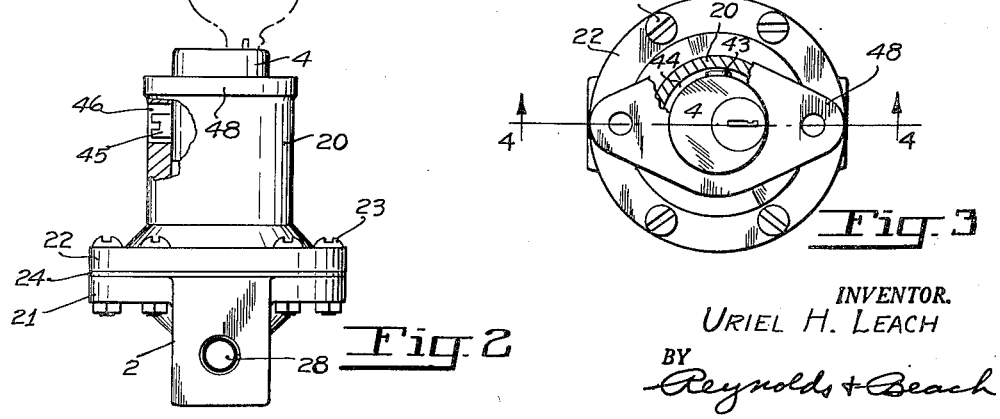
INVENTOR.
URIEL H. LEACH
BY
Reynolds & Beach
ATTORNEYS Patented Jan. 23, 1951

2,539,088

UNITED STATES PATENT OFFICE 2,539,088

SHUTOFF VALVE

Uriel H. Leach, Seattle, Wash.

Application August 17, 1946, Serial No. 691,335

10 Claims. (Cl. 251—6)

My invention relates to a shut-off valve particularly adapted for use in the fuel system of an automobile, and intended especially for emergency operation.

A particular object of my invention is to provide a valve installation which can be closed to shut off the supply of fuel to the engine, and which will be locked in closed position. While such a valve can be operated at any time, such as when the driver leaves the automobile unattended, it is especially an object to locate the valve so that it may be operated easily and inconspicuously in the event that someone should force the driver to get out of the car, and then should attempt to steal it.

Specifically it is an object to locate actuating mechanism for such a valve on the floor of the driving compartment immediately forward of the seat, where it will be readily accessible, yet may be concealed under the floor mat.

It is a further object to provide such valve mechanism which may be installed easily in an automobile without requiring appreciable rearrangement of fuel system components.

An advantage of the valve mechanism itself is the simplicity of its construction, which enables it to be manufactured economically, while at the same time the operation of the valve is positive and effective. Its parts are rugged, and will resist wear, even if the valve is closed habitually when leaving the automobile, as a safety precaution, yet on the contrary, if the valve ordinarily is not used, its parts will not deteriorate so that the valve structure will leak, nor become inoperative so that the valve will not function satisfactorily when actuated in case of emergency.

Further advantages of my valve mechanism will be pointed out in the following detailed description of the valve construction shown in the drawings. While it is illustrated as installed in an automobile, which is its principal field of application, it may be used in other types of motor vehicles or even for stationary installations.

Figure 1 is a side elevation view of my valve mechanism, indicating the manner in which it may be installed in the fuel line of an automobile.

Figure 2 is an end elevation view of the valve mechanism, and Figure 3 is a plan view of it, in both instances parts being broken away to reveal internal construction.

Figure 4 is a longitudinal sectional view through the valve mechanism, taken on line 4—4 of Figure 3, showing the valve in open position, and Figure 5 is a similar sectional view with the valve closed.

In the conventional automobile the engine 1 is located in front of the driver's seat 10, while the fuel tank is carried at the rear of the vehicle well behind the driver's seat. Consequently, the fuel line 11 passes under the floor 12 of the body from the fuel tank to the pump 13. This pump draws fuel from the tank and supplies it through a pipe 14 to the carburetor 15. My shut-off valve 2 may therefore be placed in the fuel supply line 11 and located immediately forward of the driver's seat 10.

The construction of the valve mechanism, shown in detail in Figures 2 to 5, inclusive, incorporates a housing 20 secured to the valve body 2. Preferably the body and housing have cooperating flanges 21 and 22 which are bolted together by bolts 23 with a diaphragm 24, forming part of the valve mechanism, clamped between them. This diaphragm entirely covers the junction between the valve body and the housing above it, constituting a seal for the side of the valve body cavity 25 adjacent to the housing.

The valve body has ports in its opposite ends, preferably being threaded, which communicate with the body cavity 25. The inlet port 26, for connection to the intake fuel line, opens into the portion of the body cavity above the valve seat 27, while the outlet port 28, for connection to the vacuum fuel pump, leads from the portion of the body cavity below such valve seat, which cavity portion is closed by the diaphragm 24.

The diaphragm 24 has mounted on it a valve or valve gate 3, preferably of hard fiber material. Above the diaphragm is a backing block 31 secured to the valve by a screw 30 passing centrally through the valve and diaphragm. This block is guided for sliding reciprocation in a reduced portion of a bore 32 in housing 20, and in turn guides the valve 3 for reciprocating movement toward and from valve seat 27, shown in Figures 4 and 5.

Block 31 has a hollow stem 33 extending upward from it into the bore 32 of housing 20. Encircling this stem is a compression spring 34 bearing at one end against a shoulder 35 between the block 31 proper and its stem 33, and at the other end against the end of a lock body 4. Encircling spring 34 is a second compression spring 36, which also fits within the bore of housing 20, but has sufficient space within it to enable block 31 to move into it. One end of spring 36 bears upon a shoulder 37 encircling the reduced portion of the housing bore 32 in which block 31 fits, and the other end of this spring, like the corresponding end of springs 34, bears against the inner end of the lock body 4.

Extending diametrically through the hollow 38 of block stem 33, and secured to such stem, is a retaining pin 39. This pin passes through a diametral hole 40 extending transversely through the end of a rod 41 integral with and projecting from the lock body 4 into the hollow 38 of the block stem. As shown in both Figures 4 and 5, this hole is considerably larger than the pin to afford a reasonable amount of play or lost motion between the lock body and the block 31, lengthwise of the block stem and rod 41.

The lock body 4 encloses lock mechanism of any suitable construction, preferably unlocked by a key 42. The details of such lock mechanism are conventional and are not part of my invention, but it incorporates a detent 43 projecting laterally from the body and normally urged outward. When the key 42 is turned to unlocked position, this detent will be drawn into the lock body until its outer end is flush with the wall of such body.

The lock body 4 fits snugly within the bore of the housing 20 remote from its flange 22, and is guided for reciprocation in it. The housing has in its inner wall a recess 44 located axially of the lock body in position such that detent 43 will register with it and project into it beyond the wall of the lock body to maintain the parts in the locked position, shown in Figure 5. The lock body 4 is urged away from the end of housing 20 which receives block 31 by spring 36, reacting from a shoulder 37 of housing 20. Consequently outward movement of the lock body effected by the force of such spring must be limited. For this purpose a stop screw 45 is threaded in a side of the lock body and slidably received in a slot 46 closed at its ends, formed in the wall of housing 20.

Since the lock mechanism is preferably mounted in the floor of the automobile body the key receiving end of the lock body 4 will project upward. To prevent dirt from falling into the key socket a cap 47, recessed to fit over the end of the lock body, may be supplied. Such cap also affords a greater surface against which pressure may be applied to press the lock body into locked position against the pressure of spring 36. Ears 48 can be formed on the end of the housing 20 opposite its flanged end 22, to be secured by bolts 49 to a suitable mounting in an aperture of the floor boards.

When the parts of the valve mechanism are in the unlocked position the valve 3 will be held open so that fuel may flow normally from the inlet port 26 through the valve body cavity 25, past valve seat 27, and out through the outlet port 28, as indicated by the arrows in Fig. 4. Spring 36, pressing outward against the inner end of the lock body 4, will normally hold it in the projected or unlocked position shown in Fig. 4. The degree of such projection will be limited by engagement of stop pin 45 with one end of its slot 46. The outward movement of the lock body accomplished before it is stopped by such stop mechanism will, however, be sufficient to move the detent 43 beyond its locking recess 44. Even though the lock mechanism within block 4 is allowed to return to locked position, therefore, detent 43 cannot move radially outward because of its engagement with the inner wall of housing 20 beyond its recess. During such outward movement the valve retracting mechanism, formed by the rod 41 and interconnected block stem 33, will draw the valve away from its seat into open position.

With the lock body 4 thus held resiliently in its projecting position by spring 36, spring 34, reacting from the inner end of the lock body 4, will press block 31 away from the lock body. Movement of such block away from the lock body is limited by engagement of cross pin 39 with the side of aperture 40 in stem 41 remote from the lock body. Despite the force of spring 34 against block 31, therefore, valve 3 cannot be moved into closed position as long as the lock body is maintained in its projected, unlocked position.

To close valve 3 at any time it is only necessary to step on, or otherwise press, cap 47 sufficiently to slide the lock body 4 inwardly relative to the bore 32 of housing 20 until the detent 43 registers with its locking recess 44. At that time the lock mechanism will snap the detent radially outward to project into and catch in the locking recess, so that the lock body will be held against outward valve opening movement until it has been unlocked by a proper key 42.

As the lock body 4 is pressed inward against the resilience of spring 36 such spring will be compressed. Initially, however, lock block 4, rod 41, block 31, and spring 34, will be moved inward without any relative movement. As the block 31 is thus slid in the bore of housing 20, however, diaphragm 24 will be deflected, and valve 3 will be moved toward its seat 27. Such deflection of the diaphragm, which is preferably of rubber impregnated canvas composition, does not exert an appreciable force against the block 31. When the valve 3 contacts its seat its movement, and that of block 31 and diaphragm 24, will be arrested immediately, even though the lock body 4 may still be moving inward. Such relative movement of the lock body and block 31 cannot break any part, however, because of the loose connection between the stem 33 of such block and the lock body rod 41 afforded by the small pin 39 and large hole 40 in which it fits.

The initial tension of spring 34 may be of any value selected, and such tension will be maintained by the movement limiting action of pin 39 and recess 40 between the lock body stem 41 and the stem 33 of block 31. As soon as valve 3 is pressed against its seat 27 with a pressure equal to the force of spring 34, however, pin 39 will be lifted from engagement with the wall of its aperture 40 so that the full force of the spring is transmitted to the valve. Consequently the valve is resiliently held firmly against its seat by the resilience of spring 34 when the parts of the valve mechanism have been shifted into the locked position shown in Fig. 5.

When it is desired to open the valve again the floor mat may be turned back, cap 47 lifted off the lock body, and the key 42 inserted into it and turned to retract the locking detent 43 into such body. The upper surface of cap 47 is rounded so that, as shown in Fig. 1, it may lie beneath the floor mat, even when the mechanism is in unlocked condition, without being noticeable. Consequently the driver, in getting out of the car, need merely step on the button inconspicuously to shut off the flow of fuel through the supply pipe 11 to pump 13. Some fuel will, of course, remain in the carburetor 15, but this quantity will be sufficient only to drive the automobile for a short distance, but far enough to enable the car owner to escape if his car should be taken from him.

Particular attention is directed to the continual seal between the cavity 25 of the valve body 2 and the floor of housing 20 afforded by the diaphragm 24, whether the valve mechanism is in its locked or unlocked position, and whether the valve 3 is open or closed. In the normal open position of the valve, shown in Fig. 4, the diaphragm may be flat. When the diaphragm is deflected by movement of the valve to closed position, as shown in Fig. 5, it will still afford a positive seal between the two main parts of the valve assembly. The diaphragm should, of course, be made of some material, such as synthetic rubber, which is not deteriorated by contact with gasoline or other petroleum products.

I claim as my invention:

1. Shut-off valve mechanism comprising a valve body having a cavity therein, a valve seat located in such cavity of the valve body, a housing mounted on said valve body and having a bore therein, valve means received in the cavity of said valve body and engageable with said valve seat to shut off flow of fluid through the valve body cavity, including a diaphragm interposed between said valve body and said housing disposed substantially perpendicular to said housing bore, and separating the cavity of said valve body from the bore of said housing, a lock body guided in the bore of said housing for reciprocation toward and away from said valve seat between an inner locked position and an outer unlocked position, a locking member engageable between said housing and said lock body by movement of said lock body farther into said bore toward said valve seat, operable to hold said lock body in its inner locked position, and releasable for outward movement of said lock body into its unlocked position, and means interengaged between said lock body and said valve means, and operable to press said valve means into closing engagement with said valve seat when said lock body is in locked position and to withdraw said valve means from engagement with said valve seat by movement of said lock body from its locked position away from said valve seat.

2. Shut-off valve mechanism comprising a valve body having a cavity therein, a valve seat located in such cavity of the valve body, a housing mounted on said valve body and having a bore therein, valve means received in the cavity of said valve body and engageable with said valve seat to shut off flow of fluid through the valve body cavity, including a diaphragm interposed between said valve body and said housing, disposed substantially perpendicular to said housing bore, and separating the cavity of said valve body from the bore of said housing, a lock body guided in the bore of said housing for reciprocation toward and away from said valve seat between an inner locked position and an outer unlocked position, spring means interengaged between said housing and said lock body and tending to move said lock body relative to said housing in a direction away from said valve seat, a locking member engageable between said housing and said lock body, by movement of said lock body farther into said bore toward said valve slot, operable to hold said lock body in its inner locked position against the force of said spring means, and releasable for outward movement of said lock body into its unlocked position, and means interengaged between said lock body and said valve means, and operable to press said valve means into closing engagement with said valve seat when said lock body is in locked position and to withdraw said valve means from engagement with said valve seat by movement of said lock body, effected by said spring means, from its locked position away from said valve seat upon release of said locking member from said housing.

3. Shut-off valve mechanism comprising a valve body having therein a cavity, a valve seat located in said cavity of the valve body, a housing on said valve body having a bore therein, valve means received in the cavity of said valve body and engageable with said valve seat to shut off flow of fluid through the valve body cavity, a lock body guided in the bore of said housing for reciprocation toward and away from said valve seat between an inner locked position and an outer unlocked position, a locking member engageable between said housing and said lock body, operable by movement of said lock body farther into said bore to hold said lock body in its inner locked position and releasable for outward movement of said lock body into its unlocked position, valve retracting means interconnecting said lock body and said valve means and operable to withdraw said valve means from engagement with said valve seat by movement of said lock body outward from its locked position toward its unlocked position, and compression spring means reacting between said lock body and said valve means and operable to press said valve means resiliently into closing engagement with said valve seat when said lock body is held in locked position.

4. Shut-off valve mechanism comprising a valve body having therein a cavity, a valve seat located in said cavity of the valve body, a housing on said valve body having a bore therein, valve means received in the cavity of said valve body and engageable with said valve seat to shut off flow of fluid through the valve body cavity, a lock body guided in the bore of said housing for reciprocation toward and away from said valve seat between an inner locked position and an outer unlocked position, a locking member engageable between said housing and said lock body, operable to hold said lock body in its inner locked position and releasable for outward movement of said lock body into its unlocked position, valve retracting means interconnecting said lock body and said valve means and operable to withdraw said valve means from engagement with said valve seat by movement of said lock body outward from its locked position toward its unlocked position, a spring encircling said valve retracting means and bearing at opposite ends on said housing and on said lock body, operable to move said lock body relative to said housing from its locked position into its unlocked position away from said valve seat upon release of said locking member from said housing, and compression spring means reacting between said lock body and said valve means and operable to press said valve means resiliently into closing engagement with said valve seat when said lock body is held in locked position.

5. Shut-off valve mechanism comprising a valve body having a cavity therein, a valve seat located in such cavity of the valve body, a housing mounted on said valve body and having a bore therein, valve means received in the cavity of said valve body and engageable with said valve seat to shut off flow of fluid through the valve body cavity, including a diaphragm interposed between said valve body and said housing and separating the cavity of said valve body from the bore of said housing, a member received in the bore of said housing for reciprocation toward and away from said valve seat between an inner position and an outer position, spring means interengaged between said housing and said reciprocable member and operable to move said reciprocable member relative to said housing in a direction away from said valve seat, valve retracting means interconnecting said reciprocable member and said valve means to withdraw the latter from said valve seat by movement of said reciprocable member effected by said spring means, means operable to hold said reciprocable member in its inner position against the force of said spring means, and further spring means reacting between said reciprocable member and said valve means and operable to press said valve means resiliently into closing engagement with said valve seat.

6. Shut-off valve mechanism comprising a valve body having a cavity therein, a valve seat located in such cavity of the valve body, a housing mounted on said valve body and having a bore therein, valve means received in the cavity of said valve body and engageable with said valve seat to shut off flow of fluid through the valve body cavity, including a diaphragm interposed between said valve body and said housing and separating the cavity of said valve body from the bore of said housing, a lock body guided in the bore of said housing for reciprocation toward and away from said valve seat between an inner locked position and an outer unlocked position, spring means interengaged between said housing and said lock body and operable to move said lock body relative to said housing in a direction away from said valve seat, valve retracting means interconnecting said lock body and said valve means to withdraw the latter from said valve seat by movement of said lock body effected by said spring means, a locking member interengageable between said housing and said lock body operable to hold said lock body in its locked position against the force of said spring means, and further spring means reacting between said lock body and said valve means and operable to press said valve means resiliently into closing engagement with said valve seat.

7. Shut-off valve mechanism comprising a valve body having therein a cavity, a valve seat located in such cavity of the valve body, a housing mounted on said valve body and having a bore therein, valve means received in the cavity of said valve body and engageable with said valve seat to shut off flow of fluid through the valve body cavity, including a diaphragm interposed between said valve body and said housing and separating the cavity of said valve body from the bore of said housing, and a hollow stem projecting in the direction away from said valve seat, a lock body guided in the bore of said housing for reciprocation toward and away from said valve seat between an inner locked position and an outer unlocked position, and having a rod extending toward said valve means with its end projecting into the hollow of said stem, and having an aperture in such end extending transversely therethrough, a pin received in such rod aperture and extending transversely through the hollow of said stem and anchored in the sides of said stem, said pin being of a width considerably less than the width of such rod aperture to afford lost motion between said rod and said stem lengthwise thereof, a locking detent interengageable between said housing and said lock body and operable to hold said lock body in locked position, and a spring encircling said rod and said stem and reacting between said lock body and said valve means to press said valve means resiliently into closing engagement with said valve seat when said lock body is held in locked position by said locking detent.

8. Shut-off valve mechanism comprising a valve body having a therein a cavity, a valve seat located in such cavity of the valve body, a housing mounted on said valve body and having a bore therein, a diaphragm interposed between said valve body and said housing and separating the cavity of said valve body from the bore of said housing, a valve mounted on and projecting downward from said diaphragm and engageable with said valve seat to shut off flow of fluid through said valve body cavity, a block above said diaphragm secured to said valve, guided in the bore of said housing for reciprocation with said valve toward and away from said valve seat, and having a hollow stem projecting therefrom in the direction away from said valve, a lock body guided in the bore of said housing for reciprocation toward and away from said valve seat between an inner locked position and an outer unlocked position, and having a rod extending toward said block with its end projecting into the hollow of its stem, and having an aperture in such end extending transversely therethrough, a pin received in such rod aperture and extending transversely through the hollow of said block stem and anchored in the sides of said stem, said pin being of a width considerably less than the width of such rod aperture to afford lost motion between said rod and said block stem lengthwise thereof, a spring encircling said rod and said block stem and bearing at opposite ends on said housing and said lock body, tending to move said lock body relative to said housing in a direction away from said valve seat, a locking detent interengageable between said housing and said lock body and operable to hold said lock body in locked position against the action of said spring, and a second spring encircling said rod and said block stem, located within said first spring, and reacting between said lock body and said block to press said valve resiliently into closing engagement with said valve seat when said lock body is held in locked position by said locking detent.

9. Shut-off valve mechanism comprising a valve body having therein a cavity, a valve seat located in said cavity of the valve body, a housing on said valve body having an axial bore therein opening between said cavity and the end of said housing remote from said valve body, valve means received in the cavity of said valve body and comprising a flexible diaphragm sealing off said cavity from said bore, and a valve gate engageable with said valve seat to shut off flow of fluid through the valve body cavity, a lock member guided for reciprocation axially in said housing bore toward and away from said valve seat, releasable detent means coacting between the wall of said bore and said lock element and operable automatically to lock said element in an inner position in said bore by movement of said element inwardly to such position, spring means urging said element normally into an outer, unlocked position in said bore from locked position, upon release of said detent means, means interconnecting said valve gate and said lock element for conjoint movement thereof toward and away from said valve seat, said means comprising a stem connected to said valve gate through said diaphragm and guided for reciprocation axially within said bore, lost motion means interconnecting said stem and said lock element, and a loaded compression spring reacting between said lock element and said stem, urging said stem away from said lock element and inwardly toward said valve seat, valve actuating means projecting outwardly of said bore from said lock element for pressing said element inwardly to lock said valve in closed position, and means operable to release said detent means for unlocking said valve to effect opening thereof.

10. The shut-off valve defined in claim 9 wherein said projecting means includes a removable cap covering the outer end of the lock element, and wherein the lock element release means includes a key hole opening outwardly thereof and beneath said cap.

URIEL H. LEACH.

REFERENCES CITED

The following references are of record in the file of this patent:

UNITED STATES PATENTS

| Number | Name | Date |
|---|---|---|
| 1,000,523 | Illsley | Aug. 15, 1911 |
| 1,040,509 | Cleveland | Oct. 8, 1912 |
| 1,211,756 | Reid | Jan. 9, 1917 |
| 1,700,989 | Pinkerton | Feb. 5, 1929 |
| 1,829,276 | Guthmuller | Oct. 27, 1931 |

Certificate of Correction

Patent No. 2,539,088 January 23, 1951

URIEL H. LEACH

It is hereby certified that error appears in the printed specification of the above numbered patent requiring correction as follows:

Column 5, line 69, for the word "slot" read *seat*; column 8, line 10, strike out "a", first occurrence;

and that the said Letters Patent should be read as corrected above, so that the same may conform to the record of the case in the Patent Office.

Signed and sealed this 3rd day of April, A. D. 1951.

[SEAL]

THOMAS F. MURPHY,
*Assistant Commissioner of Patents.*